(No Model.) 3 Sheets—Sheet 1.

M. M. GARVER.
ELECTRICAL MEASURING INSTRUMENT.

No. 426,992. Patented Apr. 29, 1890.

WITNESSES:
Gustave Dieterich
J. W. Jenkinson

INVENTOR
Madison M. Garver
BY Park Benjamin
his ATTORNEY.

(No Model.) 3 Sheets—Sheet 2.

M. M. GARVER.
ELECTRICAL MEASURING INSTRUMENT.

No. 426,992. Patented Apr. 29, 1890.

WITNESSES:
Gustave Dieterich.
J. W. Jenkinson.

INVENTOR
Madison M. Garver
BY Park Benjamin
his ATTORNEY.

(No Model.) 3 Sheets—Sheet 3.
M. M. GARVER.
ELECTRICAL MEASURING INSTRUMENT.
No. 426,992. Patented Apr. 29, 1890.
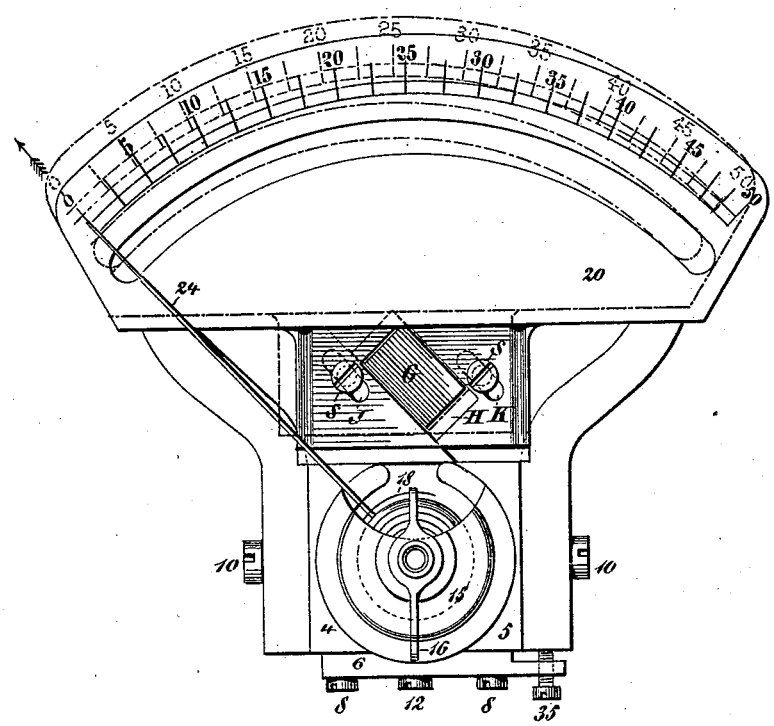
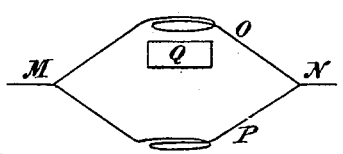 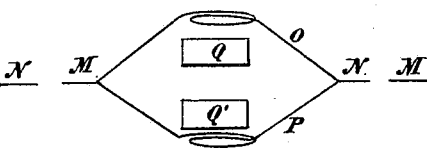 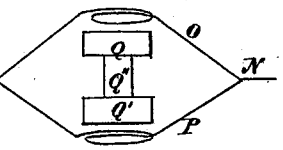
WITNESSES:
Gustave Dieterich
J. W. Jenkinson
INVENTOR
Madison M. Garver
BY Park Benjamin
his ATTORNEY.

UNITED STATES PATENT OFFICE.

MADISON M. GARVER, OF NEWARK, NEW JERSEY.

ELECTRICAL MEASURING-INSTRUMENT.

SPECIFICATION forming part of Letters Patent No. 426,992, dated April 29, 1890.

Application filed January 18, 1890. Serial No. 337,382. (No model.)

*To all whom it may concern:*

Be it known that I, MADISON M. GARVER, of Newark, Essex county, New Jersey, have invented a new and useful Improvement in Electrical Measuring-Instruments, of which the following is a specification.

My invention relates to an instrument for measuring the fall of potential between the terminals of a conductor in circuit, and is here shown applied to an apparatus of the general type and construction of that patented to Edward Weston by Letters Patent No. 392,387, dated November 6, 1888.

My invention consists more particularly, first, and broadly, in means for equalizing the temperature in both branches of a divided conductor when said conductor is traversed by a current, or, in other words, of preventing a greater radiation of heat from or to one branch of the conductor than from or to the other branch, and thus obviating differences in resistance in said branches due to the heating of the material composing them, and, second, in means for adjusting the scale so as to cause a percentage variation in the relative lengths of the scale-divisions.

Figure 1:
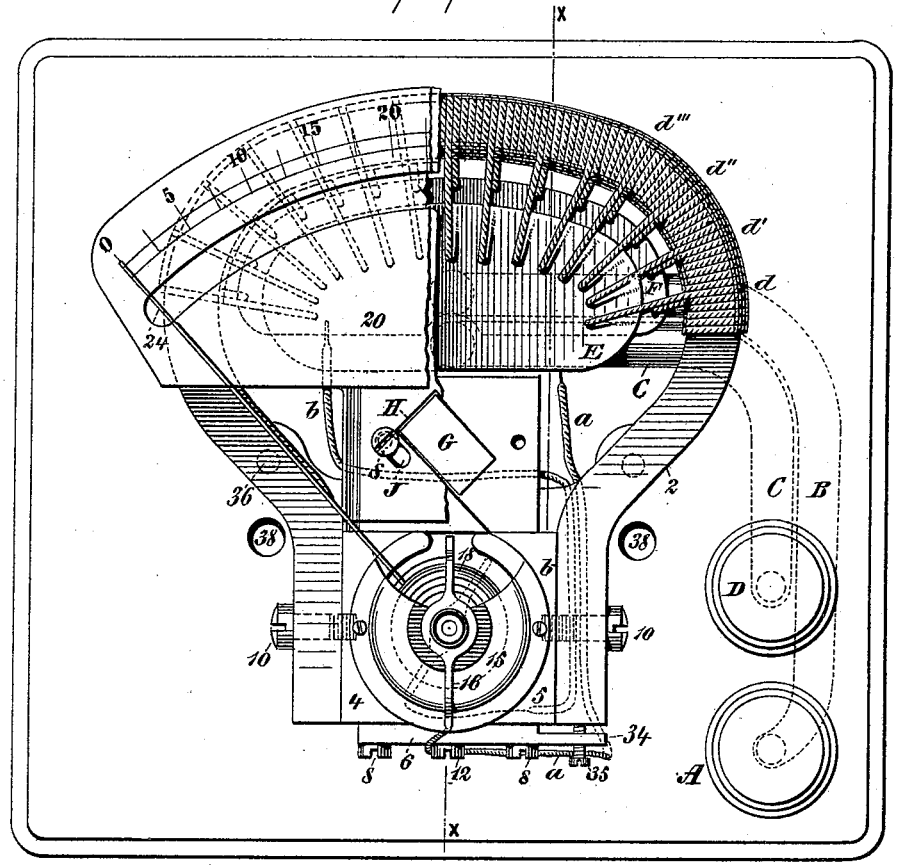
Figure 2:
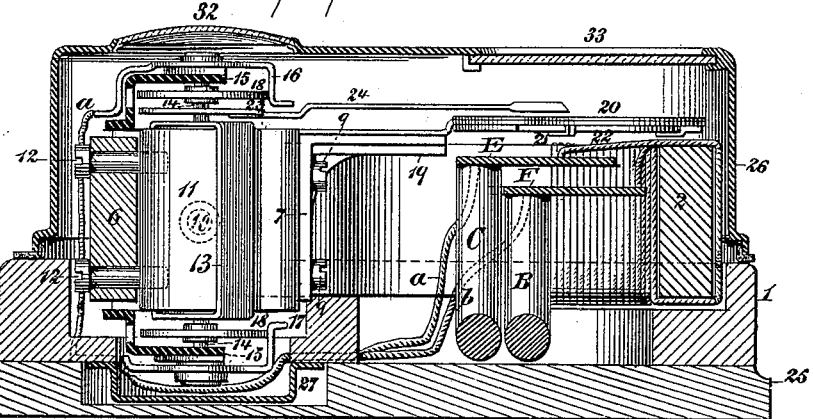
Figure 3:
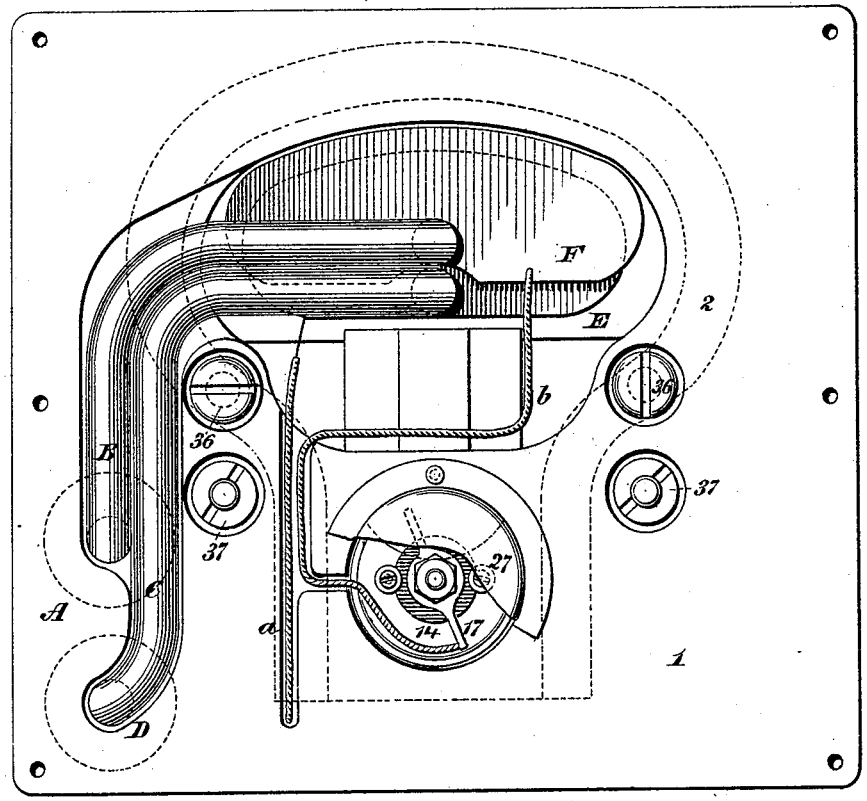
Figure 4:
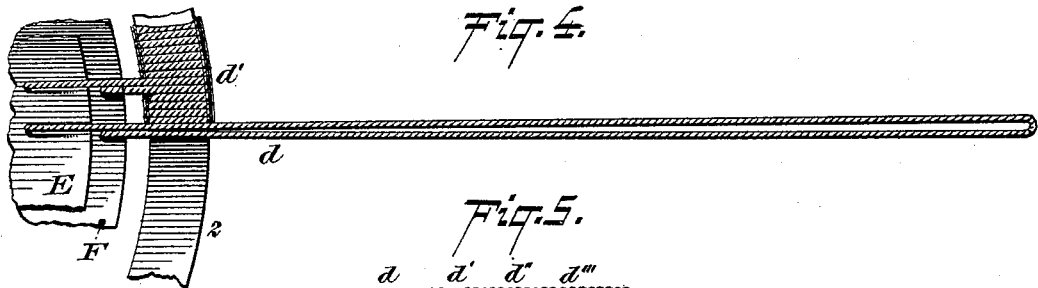
Figure 5:
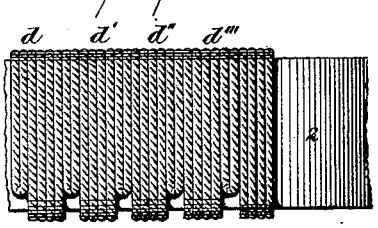

In the accompanying drawings, Figure 1 is a plan view. Fig. 2 is a section on the line X X of Fig. 1. Fig. 3 is a bottom view of the base-board. Fig. 4 exhibits the mode of winding the loop-wires around the permanent magnet. Fig. 5 shows a portion of said magnet with said wires wound and in place. Fig. 6 is a plan view illustrating the mode and effect of displacement of the scale-plate; and Figs. 7, 8, and 9 are diagrams illustrating the mode of equalizing the temperature in the branches of a divided conductor in circuit.

Similar figures and letters of reference indicate like parts.

1 is the base-board, having suitable openings to receive the working parts of the apparatus.

2 is a permanent magnet, secured in place on the base-board 1 by screws 36, Fig. 3.

4 and 5 are pole-pieces having their opposing faces hollowed out to form a cylindrical opening. These pole-pieces are connected together by a plate 6 on one side and plate 7, on the other. Screws 8 pass through the plate 6 and into the body of said pole-pieces, and similar screws 9 pass through the plate 7 and also into said pole-pieces. The pole-pieces thus connected together are secured in contact with and between the arms of the permanent magnet by screws 10. In the cylindrical space between the pole-pieces 4 and 5 is supported a cylinder 11, of magnetic material, by means of screws 12, which pass through the plate 6. In the annular space between said cylinder 11 and the inner faces of the pole-pieces 4 and 5 is disposed a frame of copper, around which is wound the coil 13 of the instrument. The frame is provided with pivot-pins 14, the extremities of which are received in jeweled sleeve-bearings, which bearings are supported in the caps 15. Around each pivot-pin, and connected to a fixed collar thereon, is a spiral spring 18, the outer ends of said springs being connected to pivoted arms 16 17. These arms are received upon sleeves of insulating material, which surround the bearing-sleeves of the pivots, so that a current entering at one arm, as 16, passes through the spring 18, connected thereto, and thence through the upper pivot-pin, thence through the coil 13, and thence through the lower pivot-pin, lower spring, and arm 17. The effect of a current thus conducted through the coil 13 is to cause said coil to turn on its pivot and to set itself at an angle, which angle is proportional to the strength of the current passing through said coil. The movement of said coil is resisted by the action of the springs 18, which, however, is a constant resistance. The effect of the springs is to return the coil to its normal position after the current ceases.

From the plate 7 extends a horizontal projection 19, upon which is secured the scale-plate 20. In the scale-plate 20 is made a curved opening, and on the rear side of this opening there is attached by clips 21 a mirror 22. Upon the upper pivot-pin is secured a light disk 23, to which is attached the index-needle 24, which extends over the scale.

The base-plate 1 is attached to a back cover 25, in which is a recess, which receives a metal cover 27, which is secured to said base-plate 1 and serves to protect the coil and other working parts. A metal box-shaped cover 27 fits over the mechanism of the instrument, as shown in Fig. 2, and is secured upon the base-plate 1 by screws 37, passing through the openings 38, Fig. 1. In said cover 31 are openings 32

33, provided with glass, so as to allow of inspection of the scale-plate, and also of the rotating coil.

On the plate 6 is a projection 34, through which pass two adjusting-screws, one of which is shown at 35, and which are disposed, respectively, above and below the plane passing through the pivot-screws 10. By means of these screws the pole-pieces 4 and 5 may be rocked on said pivot-screws 10, so as to level the scale-plate 20.

The circuit in the instrument so far as described proceed as follows: From the binding-post D to the bent rod or thick wire C, to wire $a$, to arm 16, spring 18, and by the pivot-pin to coil 13, thence by the lower pivot-pin to the lower spring 18, lower arm 17, to wire $b$, to bent rod or thick wire B, and thence to binding-post A, or vice versa.

The foregoing construction and combination of parts are not of my invention, but are the invention of Edward Weston, and the mode of operation thereof is substantially described in the aforesaid Letters Patent granted to said Weston.

I will now describe the novel features in the instrument which constitute my present invention. The bent rods B and C are preferably made of copper and suitably formed to support, respectively, two horizontal metal plates E and F. Connected at their respective ends to said plates are a series of loops $d$ $d'$ $d''$ $d'''$, &c., of insulated wire, which loops are successively wound around the body of the magnet 2. In Fig. 4 the loop $d$ is shown extended, and the loop $d'$ is shown wound around the magnet. The wires $a$ and $b$ are also connected, respectively, to the plates E and F, and therefore the coil 13 is one branch of the divided circuit and the loops $d$ $d'$, &c., in the other branch of said circuit.

In accordance with well-known laws the movable coil 13, being located in the field of force of the magnet 2, will when traversed by its proportion of the current assume a certain angular position, which, being indicated by the index or pointer moving over a suitable scale, will measure the fall in potential of the current between the plates E and F, and hence in the present instrument the strength of said current.

It will be obvious that the relative resistances of the two branches of the circuit should be uniform, and it will be equally obvious that if one branch of the circuit undergoes variation in temperature while the other branch does not this uniform relation cannot be maintained. For example, the resistance of copper increases at the rate of about two-tenths of one per cent. for every degree Fahrenheit in temperature; hence an elevation of temperature of but 5° occurring in one branch of the circuit of copper wire and not in the other would increase the resistance of the first-named branch by one per cent., thus bringing a considerable source of error into the instrument.

Referring now to Figs. 7, 8, and 9, which are merely illustrative diagrams, assume a circuit between M and N divided into branches O and P. Near the conductor in branch O, Fig. 7, let there be placed a mass of metal Q. Then, assuming both branches O P to be equally heated by the current, it is clear that the branch O nearest the mass Q will radiate its heat to said mass, and therefore will become cooled quicker than the branch P, and therefore the branch P, being at a higher temperature than the branch O, will offer a greater resistance for that reason to the current than will branch O.

In Fig. 8, representing the same divided circuit, assume another mass of metal Q' placed in proximity to the branch P. If the two masses Q and Q' be rigorously equal, then Q will absorb as much heat from branch O as Q' will absorb from branch P; but if the relation of the mass Q in all respects to the branch O be not rigorously the same as the relation of the mass Q' to the branch P, then the heat absorption by one mass will not be the same as the heat absorption by the other, and again an inequality in the temperature of the two branches may result.

Referring now to Fig. 9, still representing the same divided circuit, the masses Q Q' are united to the bar Q'' of similar material, so that there may be a free conduction of heat from one to the other, and under this condition it will be apparent that equalization of temperature in both branches O and P must follow, for if the total mass Q Q' Q'' receive more heat from branch O than it does from branch P it will transmit the excess to branch P, and so elevate the temperature of that branch, and even if the mass in proximity to one branch is different in absorbing capacity from the mass in proximity to the other, still an excess of heat in one branch is transmitted through the mass to the other; or, to put it in another way, the temperature of the whole mass may be sufficiently elevated by one branch of the circuit to prevent it absorbing heat from the other branch.

Referring now to Fig. 1, it will be seen that I have applied this principle in my present instrument. The fine-wire coil 13 is obviously in close proximity to the pole-pieces 4 and 5 and the solid cylinder 11, and hence may readily radiate the heat due to passage of the current through the coil to these metallic masses. The coil 13, as has already been explained, is in one branch of the circuit from the plates E F. The several loops $d$ $d'$ $d''$, &c., are in the other branch of the circuit also from said plates E F. By differentially winding the loops upon the magnet 2, I prevent, of course, any magnetic effect upon the magnet inclosed, but at the same time I bring this series of conductors $d$ $d'$ $d''$, &c., carrying parallel currents, into close proximity with the body or mass of the magnet. Consequently the loops $d$ $d'$, &c., radiate their heat to the magnet; but the pole-pieces 4 and 5 and cylinder 11 are also united to the magnet, so that heat may be conducted throughout the whole as a unit mass; hence I have reproduced the conditions of Fig. 9. If the coil 13 is heated by the passage of the current, the loops d d', &c., will also be heated. The coil 13 in one branch of the circuit would radiate its heat to the cylinder 11 and pole-pieces 4 and 5, but this is prevented by the fact that these parts are heated by the effect of the same current which passes through the other branch of the circuit which includes the loops d d', &c. Therefore the temperature of the coil, and, in fact, in both branches of the circuit in the instrument, is maintained practically uniform.

Referring now to the device for scale adjustment this is best shown in Fig. 6. It sometimes happens that through slight errors in adjustment or construction the needle for a given current indicates on the scale a fraction (more or less) of a degree, for example, than it should do. This of course may be corrected by alterations in the coil, &c.; but it is much simpler and easier to move the scale-plate, so that a percentage variation (more or less) will be caused in various divisions of the scale. To illustrate, and referring to Fig. 6, supposing that after moving from its zero position over to the limit of its swing the needle is found to be in error a distance of one degree—that is, it may fail to reach the extremity of the scale or pass beyond said extremity to this extent; but it will be obvious that if the scale be moved bodily in such direction, while the needle may still remain at the zero-mark, the point on said scale which the needle should indicate when at the limit of its swing is brought into proper position with reference to said needle. Then the error may be corrected. Upon the plate 19 is a projection G, which enters a slot H in the scale-plate 20. The slot H is slightly longer than the projection G, so that the plate 20 may be moved on the latter. The plate is also provided with two slots J K, through which pass the screws S, uniting said plate to the plate 19. The sides of the projection G and of the slot H which receives it, and also the sides of the slots J K, are rigorously parallel with the radial line drawn from the pivot center of the needle 24 to the zero-mark on the scale; hence when the screws S are loosened the scale-plate can be slid only in a line coinciding with the direction of the radius aforesaid. Consequently, despite this movement of the plate, the needle still remains pointing to the zero-mark, as indicated by the dotted lines in Fig. 6; but the effect of moving the scale-plate outwardly, obviously, is to shorten the total scale, as shown by dotted lines, Fig. 6, while the effect of moving it inwardly is to lengthen said scale. If, therefore, the needle with the scale-plate in a certain position fails to reach the scale limit by a certain division of the scale one degree, for example, it is necessary simply to slide the plate outwardly, as shown in Fig. 6, until the needle moved to the end of its path indicates the exact limit, (in the figure the 50-mark,) or, if it passes said limit by the same amount the scale is moved inwardly to accomplish the same result. The consequence is practically a percentage variation throughout the scale, the slight eccentricity being immaterial—that is to say, if its length be decreased a certain distance at the 50-mark, (to illustrate only,) it will thus be decreased half a degree at the 25-mark, quarter of a degree at the 12.5 point, and nothing at the zero-point.

I claim—

1. In combination with the branches of a divided conductor in an electrical circuit, a body capable of conducting heat interposed between said branches and situated near enough to both to receive and emit heat radiation from and to each.

2. In combination with the branches of a divided conductor in an electrical circuit, a mass of metal not in electrical contact with said branches interposed between them and situated near enough to both to receive and emit heat radiation from and to each.

3. A heat-conducting body, and in an electrical circuit a branched conductor, one branch of said conductor being near enough to said conducting-body to emit heat radiation to or receive the same therefrom, and the other branch of said conductor being wound or wrapped around said body.

4. A heat-conducting body, and in an electrical circuit a branched conductor, one branch of said conductor containing a coil, the said coil and the other branch of said conductor being near enough to said heat-conducting body to emit heat radiation to or receive the same therefrom.

5. A heat-conducting body, and in an electrical circuit a branched conductor, one branch of said conductor containing a coil disposed near enough to said heat-conducting body to emit heat radiation to or receive the same therefrom, and the other branch being wrapped or wound upon said body.

6. In an electrical measuring-instrument, and in the circuit thereof, a branched conductor, one branch of said conductor including a movable coil and the other branch a fixed resistance-coil, in combination with a heat-conducting body not in electrical contact with said coils, but located near enough to both to receive and emit heat radiations from and to each.

7. In an electrical measuring-instrument, and in the circuit thereof, a branched conductor, one branch of said conductor including a movable coil and the other branch a fixed resistance-coil, in combination with a heat-conducting body upon which said resistance-coil is wound and which extends near enough to said movable coil to receive and emit heat radiations from and to said coil.

8. In an electrical measuring-instrument, a magnet, a branched conductor, and a coil supported and vibrating in the field of force of said magnet, the said coil being disposed in one branch of said conductor and located near enough to receive and emit heat radiation from and to the poles of said magnet, and the other branch of said conductor being disposed in similar heat-radiating proximity to the body of said magnet.

9. In an electrical measuring-instrument, a magnet, a branched conductor, and a coil supported and vibrating in the field of force of said magnet, the said coil being disposed in one branch of said conductor near enough to receive and emit heat radiation from and to the poles of said magnet, and the other branch of said conductor being electrically insulated from and wrapped or wound around the body of said magnet.

10. In an electrical measuring-instrument, a magnet, a branched conductor, and a coil supported and vibrating in the field of force of said magnet, the said coil being disposed in one branch of said conductor near enough to receive and emit heat radiations from and to the poles of said magnet, and the other branch of said conductor being subdivided into a series of parallel branches $d\ d'$, &c., electrically insulated from and differentially wound upon the body of said magnet.

11. In an electrical measuring-instrument, the combination of a magnet, the plates E F, the branch wires $a\ b$, connected, respectively, to said plates and including in circuit the vibrating-coil 16, supported in the field of force of said magnet, and parallel branch wires $d$, $d'\ d''$, &c., connected at their extremities to said plates and differentially wound upon and insulated from the body of said magnet.

12. The combination, in an electrical measuring-instrument, of the bent conducting-rods B C, plates E F, respectively supported thereby and in multiple-arc circuit with said plates the wires $a\ b$, including a branch circuit, the coil 16, supported and vibrating in the field of force of said magnet, and the wires $d\ d'\ d''$, &c., insulated from and differentially wound upon the body of said magnet.

13. In an electrical measuring-instrument containing a vibrating pivoted index-needle, a scale-plate independently movable in the direction of a radius drawn from the zero or initial point thereon to the pivotal center of said needle.

14. In an electrical measuring-instrument containing a vibrating pivoted index-needle, a scale-plate independently movable in the direction of a radius drawn from the zero or initial point thereon to the pivotal center of said needle, and means for holding said plate in adjusted position.

15. In an electrical measuring-instrument, the vibrating pivoted index-needle 24, the plate 19, having projection G, and the scale-plate 20, provided with the slot H, receiving said projection G, and means for movably securing said scale-plate on said plate 19.

16. In an electrical measuring-instrument, the vibrating pivoted index-needle 24, the plate 19, having projection G, the scale-plate 20, provided with the slot H, receiving said projection, and with a parallel slot J, and the clamping-screw S, passing through said slot J and received in said plate.

MADISON M. GARVER.

Witnesses:
S. O. EDMONDS,
M. BOSCH.